W. A. TARR.
ANTISKID ATTACHMENT FOR WHEELS.
APPLICATION FILED JAN. 4, 1917.

1,254,448.  Patented Jan. 22, 1918.

INVENTOR-
William A. Tarr.
BY-
N. E. Dunlap
ATTORNEY.

UNITED STATES PATENT OFFICE.

WILLIAM A. TARR, OF BETHANY, WEST VIRGINIA, ASSIGNOR OF ONE-HALF TO A. CAMPBELL JOBES, OF WHEELING, WEST VIRGINIA.

ANTISKID ATTACHMENT FOR WHEELS.

1,254,448.

Specification of Letters Patent. Patented Jan. 22, 1918.

Application filed January 4, 1917. Serial No. 140,541.

*To all whom it may concern:*

Be it known that I, WILLIAM A. TARR, a citizen of the United States of America, and resident of Bethany, county of Brooke, and State of West Virginia, have invented certain new and useful Improvements in Antiskid Attachments for Wheels, of which the following is a specification.

This invention relates broadly to anti-skid attachments for vehicle wheels, and more particularly to a chain attachment for pneumatically tired wheels.

The primary object of the invention is to provide a device adapted for ready application to and removal from the wheels of an automobile or like vehicle for affording traction and for preventing slipping or skidding.

A further object is to provide a device of the character mentioned which, when occasion requires, may be readily attached to a wheel in such plural numbers as may be necessary, and which may as readily be detached when desired.

Further objects of the invention are to provide an anti-skid attachment which may be applied and removed without elevating the wheel from the ground; which presents a neat appearance in use, and which does not mar the painted surface of the wheel.

With these and other objects in view, the invention resides in the features of construction, arrangement of parts and combinations of elements which will hereinafter be fully described, reference being had to the accompanying drawings, in which—

Figure 1:
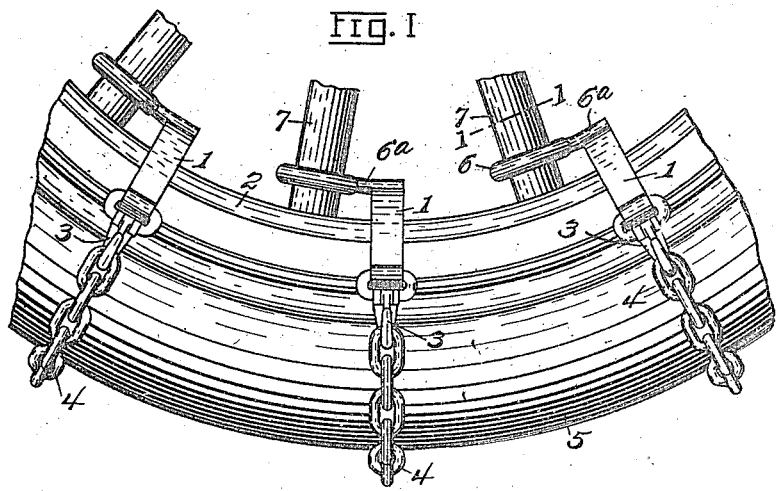
Figure 1 is a side elevation of a portion of a wheel illustrating the application of my invention.
Figure 2:
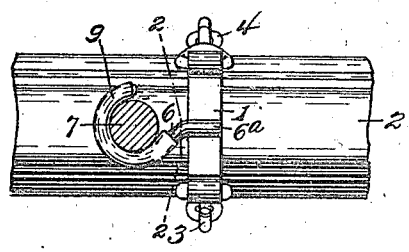
Fig. 2 is a section on line 1—1, Fig. 1, and—
Figure 3:
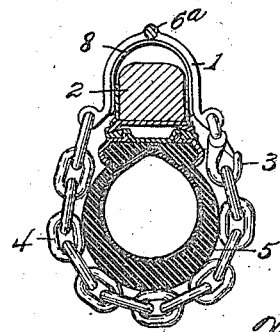
Fig. 3 is a section on the line 2—2, Fig. 2.

Referring to said drawings, 1 indicates a saddle plate of approximately bow-shape adapted to rest upon or seat in closely embracing straddling relation to the rim or felly 2 of a wheel. Said saddle plate may be shaped to conform precisely to the felly, but is preferably made in the shape illustrated in Fig. 3 so that it will seat upon fellies having either flat or convex cross-sectional inner surfaces. Attached in pivoted relation to one of the ends of said saddle plate is a clasp or snap-hook 3 of suitable form, and permanently attached in like relation to the opposite end of said plate is one end of a chain 4 which is designed to encircle a tire 5 carried by a rim mounted on the felly and to have its opposite end detachably connected to said snap-hook.

Carried by the saddle-plate 1 is a laterally extending hook 6 designed for engagement with a spoke 7 of the wheel. While said hook may be formed separate from the saddle-plate and have its shank $6^a$ attached to the latter in any appropriate manner, said parts are preferably formed integral, as shown, being formed in a one-piece casting. Said hook is so formed that the line of entrance of a spoke thereto lies out of alinement with said shank $6^a$, or at an angle of approximately forty-five degrees to said shank. As a result, a spoke can only be introduced within and removed from the embrace of said hook in a direction at approximately an angle of forty-five degrees to the shank of the hook. It will thus be seen that, when a spoke is received within the embrace of said hook and the saddle-plate occupies seated position on the felly 2, practically no movement of the saddle-plate along the felly can occur. Further, it will be seen that in order to apply the hook to and detach it from the spoke, the saddle-plate must be moved away from the felly such a distance that its ends may be moved laterally without engagement with the latter. Manifestly, therefore, when the chain 4 occupies the tire-embracing position, the saddle-plate is thereby maintained in seated position and the hook is maintained against disengagement from the spoke.

While, as indicated, the device is maintained against chance disengagement while in use, the application and removal thereof may be readily accomplished.

For protecting the paint of the wheel felly from injury from rubbing or chafing, a pad or lining 8 of rubber or like material is preferably attached to the inner face of the saddle-plate, as by rivets or a suitable adhesive. For a like purpose the spoke-engaging portion of the hook 6 preferably has a flexible tube 9 of rubber fitted thereon.

What is claimed is—

1. An anti-skid attachment for wheels, comprising a saddle-plate adapted for seating in straddling relation to a wheel felly, a flexible tread member connecting the opposite ends of said plate and adapted for assuming embracing relation to the wheel tire, one end of said member being detachably connected to said plate, and a laterally disposed fixed arm carried by said plate at a right angle to an adjacent spoke, said arm being terminated by a spoke-engaging hook.

2. An anti-skid attachment for wheels, comprising a metallic saddle-plate adapted for seating in close straddling relation to a wheel felly, a flexible tread member connecting the opposite ends of said plate and adapted to be disposed in embracing relation to the wheel tire, and a spoke-engaging hook having a shank mounted in fixed relation to said plate and disposed at right angles to an adjacent spoke, said hook having its entrance opening disposed out of alinement with its shank whereby it is rendered detachable from the spoke only when said plate is moved radially away from the felly to permit its ends to clear the latter when moved laterally.

3. An anti-skid attachment for wheels, comprising a saddle-plate adapted for seating in close straddling relation to a wheel felly, a flexible tread member connecting the opposite ends of said plate and adapted to be disposed in embracing relation to the wheel tire, at least one of the ends of said member being detachably connected, and a laterally disposed spoke-engaging hook carried in fixed relation to said plate and extending laterally therefrom substantially parallel to the adjacent portion of the felly, said hook being so disposed with respect to said plate that when said parts occupy their respective operative positions the hook prevents longitudinal movement of the plate.

In testimony whereof I affix my signature in presence of two subscribing witnesses,

WILLIAM A. TARR.

Witnesses:
ADAH L. PILCHARD,
ANNA V. WELLS.